United States Patent [19]
Soga et al.

[11] Patent Number: 5,397,597
[45] Date of Patent: * Mar. 14, 1995

[54] OPTICAL RECORDING MEDIUM AND METHOD OF MANUFACTURING THE SAME

[75] Inventors: Mamoru Soga, Osaka; Shinji Ozaki, Yao; Norihisa Mino, Settu; Kazufumi Ogawa, Hirakata, all of Japan

[73] Assignee: Matsushita Electric Industrial Co., Ltd., Osaka, Japan

[*] Notice: The portion of the term of this patent subsequent to Aug. 16, 2011 has been disclaimed.

[21] Appl. No.: 92,871

[22] Filed: Jul. 19, 1993

Related U.S. Application Data

[62] Division of Ser. No. 848,914, Mar. 10, 1992, Pat. No. 5,268,211.

[30] Foreign Application Priority Data

Jan. 17, 1991 [JP] Japan ................................ 4-006163
Mar. 13, 1991 [JP] Japan ................................ 3-048407
May 21, 1991 [JP] Japan ................................ 3-116206

[51] Int. Cl.⁶ ............................................. B05P 3/06
[52] U.S. Cl. ............................ 427/255.6; 427/341; 427/352; 427/539; 427/387
[58] Field of Search ............... 427/387, 435, 407.1, 427/352, 255, 255.6, 340, 341, 533, 535, 539

[56] References Cited

U.S. PATENT DOCUMENTS

| | | |
|---|---|---|
| 4,539,061 | 9/1985 | Sagiv .................................. 156/278 |
| 4,968,766 | 11/1990 | Kendziorski ......................... 528/32 |
| 4,992,300 | 2/1991 | Ogawa et al. ........................ 427/44 |

Primary Examiner—Michael Lusignan
Assistant Examiner—Erma Cameron
Attorney, Agent, or Firm—Fish & Richardson

[57] ABSTRACT

A chemically adsorbed film containing fluorocarbon groups is formed on an optical recording medium. Thus, an excellently water- and moisture-proof optical recording medium can be obtained. The optical recording medium is obtained by forming a chemically adsorbed film composed of fluorocarbon chain surface active material. The chemically adsorbed film is chemically bonded via siloxane covalent bonds. In the method of manufacture, an optical recording medium, e.g., an optical recording disk, is contacted with a solution which is made by dissolving a straight carbon chain surface active material having a chlorosilyl group at one end and a fluorocarbon group at the other end in a non-aqueous solvent or a gaseous phase condition, thereby chemically bonding the chlorosilane-based straight chain surface active material to the surface of the substrate via covalent siloxane bonds.

9 Claims, 3 Drawing Sheets

OPTICAL RECORDING MEDIUM AND METHOD OF MANUFACTURING THE SAME

This application is a division of U.S. application Ser. No. 07/848,914, filed Mar. 10, 1992, now U.S. Pat. No. 5,268,211.

FIELD OF THE PRESENT INVENTION

The invention relates to an optical recording medium which can be used as an optical disk, a video disk or a digital audio disk etc. More particularly, the invention relates to optical recording media having a water- and moisture-proof medium.

BACKGROUND OF THE INVENTION

Recently, optical recording media have come to be in great demand. An optical recording medium generally comprises a transparent substrate and a recording layer formed on one side of the substrate which is capable of being changed by optical energy. The medium is used for recording and reproduction of information by irradiating it with a laser beam at its substrate side. Not only materials of the recording layer but also protective films for preventing the deterioration of the recording layer by water or oxygen are being developed, as disclosed in Japanese Patent Laid-Open No. 68,850/1984.

The protective layer typically is made of a material having low moisture permeability. As inorganic materials, oxide films of $SiO_2$, $MgO$ and $Al_2O_3$ are used. As organic material, polypropylene, ethylene-vinyl acetate copolymer, polyvinylidene chloride, etc. are used.

Concerning the optical recording medium having the above structure, its water-proof means will now be described.

In order to prevent introduction of water through the substrate, oxides or fluorides are provided on the substrate surface. These inorganic materials usually have low moisture transmittance, and therefore they can improve corrosion resistance of the recording layer when the optical recording medium is held in a high relative humidity atmosphere. Further, for preventing corrosion of the recording layer, organic polymers having comparatively low moisture permeability, e.g., polyvinylidene chloride, are used in lieu of the inorganic material. Furthermore, epoxy resins or like crosslinking resins can be used as organic polymer-based protective films, as disclosed in Japanese Patent Laid-Open 70,894/1982.

However, the protective layer as noted above has the following problems.

(1) Inorganic materials such as oxides and fluorides provide weak bonding forces with respect to the transparent substrate, and are prone to separation or generation of cracks when left under high temperature, high relative humidity conditions.

(2) It is difficult to form a dense thin film of an oxide or a fluoride.

(3) With organic polymers, although the moisture permeability is low, there is a limitation on the water content barrier character. Therefore, when the polymers are left under high temperature, high relative humidity conditions for long time, the water-proof effect is lost.

(4) The crosslinking resins have many pores and have high moisture permeability. Therefore, the recording layer is readily deteriorated by water when the optical recording medium is maintained for a long time under high temperature, high relative humidity conditions.

For the above reasons, when the optical recording medium is preserved under high temperature, high relative humidity conditions, it is subject to corroding and deterioration. Therefore, requirements for the water- and corrosion-proof optical recording medium have not been met.

SUMMARY OF THE INVENTION

An object of the invention is to provide an optical recording medium comprising a transparent substrate, an optical recording layer and a chemically adsorbed film bonded via siloxane bonds to the outermost surface of the recording medium.

It is preferable in this invention that an inorganic oxide layer is formed on the optical recording layer, and a chemically adsorbed film is formed on the inorganic oxide film or on both the inorganic oxide film and the transparent substrate.

It is preferable in this invention that the chemically adsorbed film contains a fluorocarbon or hydrocarbon group.

It is preferable in this invention that the chemically adsorbed film is a monomolecular film or a polymer film.

It is preferable in this invention that the substrate is a transparent resin disk.

It is preferable in this invention that the inorganic oxide layer comprises at least one compound selected from the group consisting of $SiO_2$, $TiO_2$ and $Al_2O_3$.

It is preferable in this invention that the inorganic oxide film has a thickness of 1 to 500 nanometers.

It is preferable in this invention that the inorganic oxide film is formed by spattering or deposition.

It is preferable in this invention that a siloxane-based inner layer is formed on the optical recording layer, and the chemically adsorbed film containing siloxane bonds formed on an inner layer.

Another object of the invention is to provide a method of manufacturing an optical recording medium comprising:

contacting a substrate surface with a non-aqueous solution containing a surface active material having fluorocarbon groups and chlorosilane groups, the substrate surface having active hydrogen groups;

removing unreacted surface active material remaining on the substrate by washing the substrate with a non-aqueous organic solution to form an adsorbed monomolecular precursor film;

reacting unreacted chlorosilane groups on the adsorbed monomolecular precursor film with water after the removing step; and drying the adsorbed monomolecular film.

It is preferable in this invention that the surface active hydrogen groups are selected from the group consisting of hydroxyl groups, amino groups, and imino groups.

It is preferable in this invention that the substrate surface is made hydrophilic prior to said contacting step by a plasma or corona treatment in an oxygen or nitrogen atmosphere.

It is preferable in this invention that the surface active material is $CF_3(CF_2)_n(R)_mSiX_pCl_{3-p}$ where n represents 0 or an integer, R represents an alkylene group, vinylene group, ethynylene group, or a substituted group containing a silicon atom, an oxygen atom, m represents 0 or 1, X represents a hydrogen atom or a substituted group consisting of an alkyl group or an alkoxyl group, and p represents 0, 1 or 2.

It is preferable in this invention that an inorganic oxide film is formed by spattering or vacuum deposition on an optical recording layer, and the chemically adsorbed precursor film containing siloxane bonds is formed on the inorganic oxide layer.

It is preferable in this invention that the substrate surface is contacted with an inner layer of a non-aqueous solution containing a multi-functional surface active material having chlorosilane groups, the substrate surface having active hydrogen groups, thereby causing a chemical adsorption reaction, and a chemically adsorbed film containing siloxane bonds formed on the inner layer.

A further object of the invention is to provide a method of manufacturing an optical recording medium comprising:
contacting the substrate surface with a non-aqueous solution, the non-aqueous solution containing a surface active material having fluorine groups and chlorosilane groups and the substrate surface having active hydrogen groups to form a precursor polymer film on said substrate surface;
reacting said precursor polymer film on the substrate surface by reacting the chlorosilane groups with water to form silanol group; and
drying said adsorbed polymer film.

A still further object of the invention is to provide a method of manufacturing an optical recording medium, comprising contacting the surface of a transparent substrate having an optical recording layer with a halosilane-based surface active material under a gaseous phase condition and then reacting the surface active material with water, thereby forming a chemically adsorbed film.

It is preferable in this invention that an inorganic oxide layer is formed on the optical recording layer, and that the inorganic oxide layer or both the inorganic oxide layer and the transparent substrate are contacted with a chlorosilane-based surface active material under a gaseous phase condition, and the surface active material is reacted with water, thereby forming a chemically adsorbed film.

With the above constitution of the invention, the chemically adsorbed film is dense, less subject to cracking and less permeable to water. Further, the film is chemically bonded to the inorganic oxide layer or to the transparent substrate via siloxane bonds and hence is inseparable. Thus, the above optical recording medium is excellently water- and corrosion-proof.

Further, in a preferred embodiment of the invention in which the chemically adsorbed film contains fluoroalkyl groups, it is possible to improve the water- and corrosion-proof properties of the optical recording medium by making use of the water-repelling property of fluorine.

Further, in a preferred embodiment of the invention in which the chemically adsorbed film is a monomolecular film, a very thin and satisfactorily transparent protective film can be obtained.

Further, in a preferred embodiment of the invention in which the inorganic oxide layer contains at least one member of a group consisting of $SiO_2$, $TiO_2$ and $Al_2O_3$, further excellent water- and corrosion-proof properties can be obtained because the inorganic oxide layer itself is water- and corrosion-proof. Particularly, the $SiO_2$ layer permits increasing the density of siloxane bonds, thus permitting formation of a more dense chemically adsorbed film.

Further, in a preferred embodiment of the invention in which the transparent substrate is made of a resin, it is possible to provide an optical recording medium, which can be handled satisfactorily.

DETAILED DESCRIPTION OF THE INVENTION

Figure 1:
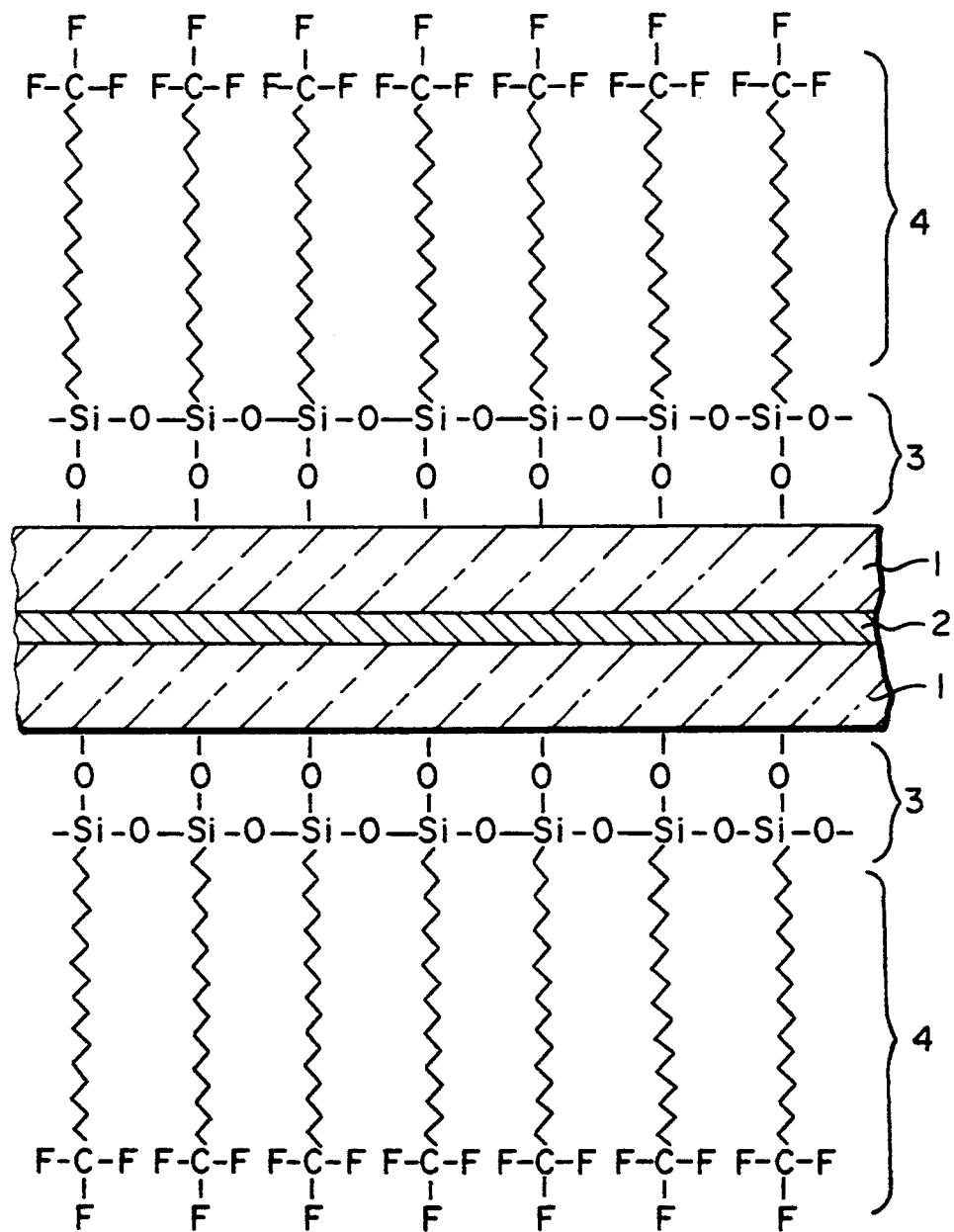
FIG. 1 is a schematic sectional view showing one embodiment of the invention, in which a chemically adsorbed film is formed via siloxane bonds on the surface of an optical recording medium.

Now, embodiments of the invention will be described with reference to the drawings. FIG. 1 is a sectional view showing a first embodiment of the optical recording medium according to the invention. Referring to FIG. 1, designated at 1 is a transparent substrate, at 2 is a recording layer, at 3 are siloxane bonds, and at 4 is a chemically adsorbed film.

Figure 3:
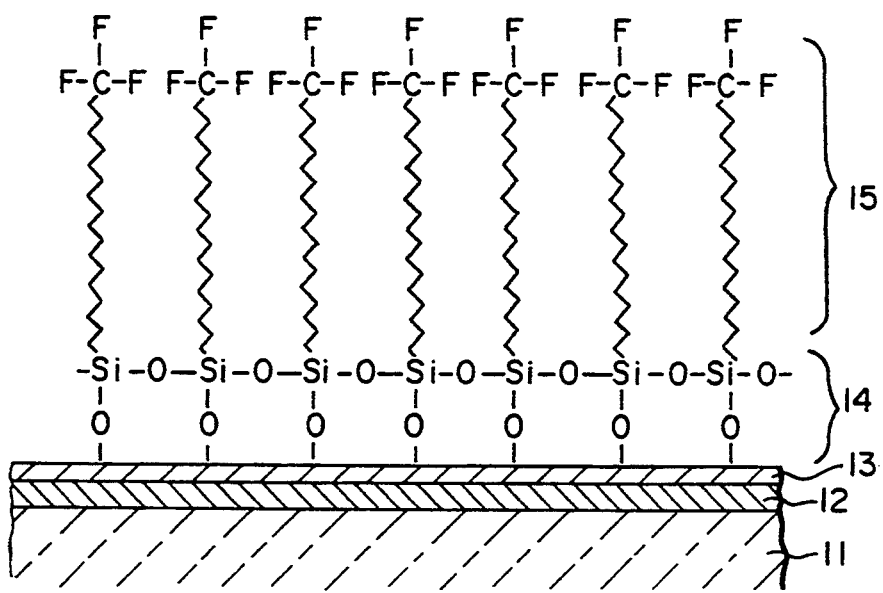
FIG. 3 is a sectional view, enlarged to a molecular level, showing a second embodiment of the optical recording medium according to the invention.

FIG. 3 is a sectional view showing a second embodiment of the optical recording medium according to the invention. Referring to FIG. 3, designated at 11 is a transparent substrate, at 12 is an optical recording layer, 13 is a metallic oxide layer, at 14 are siloxane bonds, and at 15 is a chemically adsorbed film.

The transparent substrate 1 or 11 used according to the invention may be made of such materials as glass, polycarbonate and acrylic acid resins.

The material of the metal oxide layer 13 is suitably $SiO_2$, $TiO_2$, $Al_2O_3$, etc. from the standpoint of the transparency. A $SiO_2$ substrate, the surface of which contains hydroxyl groups at a high density like the usual glass substrate, permits formation of a high density chlorosilane-based surface active material film without pretreatment with a tetrachlorosilane.

The metal oxide film 13 can be formed by spattering, vacuum deposition and like processes.

Its thickness is suitably 1 to 500 nm when it is formed on the optical recording layer 2 according to the invention. If the thickness is greater than 500 nm, separation or cracking may occur. If the thickness is less than 1 nm, pin holes may form, making the formation of the chemically adsorbed film difficult.

In the optical recording medium according to the invention, the chemically adsorbed film 4 or 15 may be formed from a chlorosilane-based surface active material containing fluorocarbon groups.

Examples of trichlorosilane-based surface active materials of the present invention include
$CF_3(CF_2)_7(CH_2)_2SiCl_3$, $CF_3CH_2O(CH_2)_{15}SiCl_3$,
$CF_3(CH_2)_2Si(CH_3)_2(CH_2)_{15}SiCl_3$,
$F(CF_2)_4(CH_2)_2Si(CH_3)_2(CH_2)_9SiCl_3$,
$F(CF_2)_8(CH_2)_2Si(CH_3)_2(CH_2)_9SiCl_3$, $CF_3COO(CH_2)_{15}SiCl_3$, $CF_3(CF_2)_5(CH_2)_2SiCl_3$, $CH_3(CH_2)_9SiC_3$, CH$_3$CH$_2$O(CH$_2$)$_{15}$SiCl$_3$, CH$_3$(CH$_2$)$_2$Si(CH$_3$)$_2$(CH$_2$)$_{15}$SiCl$_3$, CH$_3$(CH$_2$)$_6$Si(CH$_3$)$_2$(CH$_2$)$_9$SiCl$_3$, CH$_3$(CH$_2$)$_{10}$Si(CH$_3$)$_2$(CH$_2$)$_9$SiCl$_3$, CH$_3$COO(CH$_2$)$_{15}$SiCl$_3$.

Examples of lower-alkyl substituted monochlorosilane- or dichlorosilane-based surface active materials of the present invention include
CF$_3$(CF$_2$)$_7$(CH$_2$)$_2$SiCl$_n$(CH$_3$)$_{3-n}$,
CF$_3$(CF$_2$)$_7$(CH$_2$)$_2$SiCl$_n$(C$_2$H$_5$)$_{3-n}$, CF$_3$CH$_2$O(CH$_2$)$_{15}$SiCl$_n$(CH$_3$)$_{3-n}$, CF$_3$(CH$_2$)$_2$Si(CH$_3$)$_2$(CH$_2$)$_{15}$SiCl$_n$(CH$_3$)$_{3-n}$, CF$_3$CH$_2$O(CH$_2$)$_{15}$SiCl$_n$(C$_2$H$_5$)$_{3-n}$,
CF$_3$(CF$_2$)$_7$(CH$_2$)$_2$Si(CH$_3$)$_2$(CH$_2$)$_9$SiCl$_n$(CH$_3$)$_{3-n}$,
CF$_3$(CF$_2$)$_3$(CH$_2$)$_2$Si(CH$_3$)$_2$(CH$_2$)$_9$SiCl$_n$(C$_2$H$_5$)$_{3-n}$,
CF$_3$(CF$_2$)$_5$(CH$_2$)$_2$SiCl$_n$(CH$_3$)$_{3-n}$, CF$_3$COO(CH$_2$)$_{15}$SiCl$_n$ (CH$_3$)$_{3-n}$
where n represents 1 or 2.

Among these examples, trichlorosilane-based surface active materials are preferred in that chlorosilyl bonds other than those bonded to their hydrophilic groups form intermolecular bonds with adjacent chlorosilane groups by siloxane bonds, thereby permitting formation of a more firmly adsorbed film.

Trichlorosilane-based surface active materials are particularly preferred because chlorosilyl bonds other than those coupled to their hydrophilic groups form inter-molecular bonds with adjacent chlorosilane groups with siloxane bonds and thus permit formation of a more firmly adsorbed film. Further, CF$_3$(CF$_2$)$_n$(CH$_2$)$_2$SiCl$_3$ where n represents an integer, most suitably 3 to 25, is preferred because of its solubility and its water-repelling, anti-contaminating and other functional properties. Further, with an ethylene or acetylene group added to or incorporated in the alkyl fluoride chain portion, the chemically adsorbed film may be crosslinked after formation by irradiating it with an electron beam of about 5 Mrads, thus further improving the hardness of the chemically adsorbed film.

It is thus possible to further improve the hardness of the chemically adsorbed film.

The chlorosilane-based surface active material according to the invention is not limited to those in the form of a straight chain as noted above. It is possible to use a branched fluorocarbon or hydrocarbon group or those having a substituted fluorocarbon or hydrocarbon group with —Si— bond at one end (i.e., those represented by the formula R$_2$SiCl$_2$, R$_3$SiCl, R$^1$R$^2$SiCl$_2$ or R$^1$R$^2$R$^3$SiCl where R, R$^1$, R$^2$ and R$^3$ represents an fluorocarbon group or hydrocarbon group). To increase the adsorption density, however, the straight chain form is preferred.

Further, by chemically adsorbing a material for forming an inner layer material having a plurality of chlorosilyl groups, e.g., SiCl$_4$, SiHCl$_3$, SiH$_2$Cl$_2$, and Cl(SiCl$_2$O)$_n$Cl$_3$ (where n represents an integer in a range from 1 to 20), SiCl$_m$(CH$_3$)$_{4-m}$, SiCl$_m$(C$_2$H$_5$)$_{4-m}$ (where m represents 1, 2 or 3), and HSiCl$_p$(CH$_3$)$_{3-p}$, HSiCl$_p$(C$_2$H$_5$)$_{3-p}$ (where p represents 1 or 2), and then reacting it with water, surface chlorosilyl bonds are converted to hydrophilic silanol bonds, thus making the polymer composition hydrophilic. Among the materials containing a plurality of chlorosilyl groups, tetrachlorosilane (SiCl$_4$) is preferred in that it is highly reactive and low in molecular weight. It can, therefore, provide silanol bonds at a high density. In this way, it is possible to provide a highly hydrophilic composition compared to oxidation treatment of a polymer-containing substrate. To this surface, a chlorosilane-based surface active material containing fluorocarbon groups may be chemically adsorbed. In this way, a chemically adsorbed film suitably having an increased density can be obtained.

The non-aqueous solvent to be used according to the invention may be any organic solvent, which does not dissolve the plastic material with the chemically adsorbed film to be formed thereon and is free from active hydrogen able to react with the chlorosilane-based surface active material. Suitable examples of the solvent are fluorine-based solvents, e.g., 1,1-dichloro-1-fluoroethane, 1,1-dichloro-2,2,2-trifluoroethane, 1,1-dichloro-2,2,3,3,3-pentafluoropropane, 1,3-dichloro-1,1,2,2,3-heptafluoropropane, etc., hydrocarbon-based solvents, e.g., hexane, octane, hexadecane, cyclohexane, etc., ether-based solvents, e.g., dibutylether, dibenzylether, etc., and ester-based solvents, e.g., methyl acetate, ethyl acetate, isopropyl acetate, amyl acetate, etc.

As the chemically adsorbed film formed on the surface of the optical recording layer according to the invention, a single chemically adsorbed monomolecular film provides sufficient functions. A single chemically adsorbed monomolecular film may be formed by chemically adsorbing a chlorosilane-based surface active material or a material containing a plurality of chlorosilyl groups and then washing with a non-aqueous solvent. No other specific treatment is necessary. Of course, it is possible to form a chemically adsorbed film as a laminated monomolecular film. A chemically adsorbed film formed on the recording medium side preferably has a thickness of 50 nm or less.

Now, specific examples of the invention will be given.

EXAMPLE 1

An optical recording layer 2 (FIG. 1) mainly composed of tellurium dioxide (TeO$_2$) and tellurium (Te) was vacuum deposited on one surface of a polycarbonate substrate 1 having a thickness of 1.2 mm and a diameter of 120 mm. To the layer 2 was then applied another polycarbonate substrate 1, the same as that noted above using a UV-setting adhesive, thus obtaining a disk. The disk thus obtained was oxygen plasma treated in a UV dry stripper ("UV-1" manufactured by Sacom International) at an oxygen flow rate of 1 l/min. for 10 minutes to oxidize the surface. The disk was dipped and held in a cyclohexane solution containing 10$^{-2}$ mol/l of heptadecafluorodecyl-trichlorosilane [CF$_3$(CF$_2$)$_7$(CH$_2$)$_2$—SiCl$_3$] as the chlorosilane-based surface active material containing a fluorocarbon group. This step was carried out in a nitrogen atmosphere at room temperature. Since the surface of the substrate contained hydroxyl groups, a dehydrochlorination reaction between the chlorosilyl groups of the chlorosilane-based surface active material and the hydroxyl groups formed covalent bonds on the surface. This reaction is represented in the following formula [1].

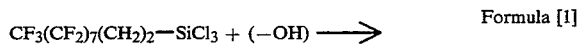

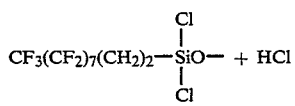

Formula [1]

The substrate was then washed with FREON 113 to remove the unreacted material remaining on the surface, followed by washing with water or exposing to air containing moisture. The —SiCl group was changed to a —SiOH group as in formula [2].

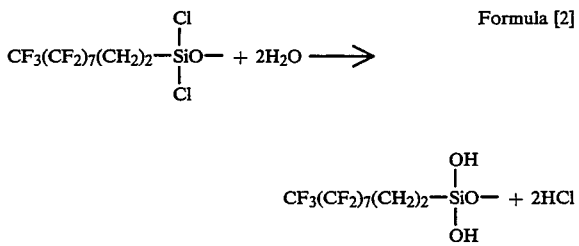

Each silanol group (—SiOH) Has then dehydrated and crosslinked to form a siloxane bond (—SiO—) after drying as in formula [3]. Drying temperature may be room temperature or above.

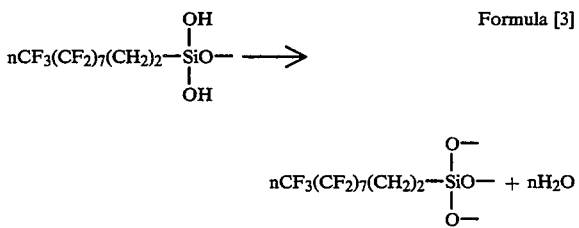

An adsorbed monomolecular film was obtained on the surface of the substrate as shown FIG. 1. The adsorbed monomolecular film has a fluorocarbon group 4 and is chemically bonded (i.e., covalently bonded) 3 to the substrate 1. The chemical bond is via a siloxane bond. The formation of chemically adsorbed monomolecular film was measured by FTIR spectrometry and the thickness was about 1.5 nanometers (nm). It was firmly bonded such that it did not separate.

The above washing step with the non-aqueous organic solution (FREON 113) was omitted, and a fluorine-based polymer film was adsorbed to the substrate surface. The fluorocarbon-based polymer film was in satisfactorily close adherance to the substrate. The film was substantially pin-hole free.

EXAMPLE 2

The same experiment as in Example 1 was carried out except for the use of tridecafluorooctyl trichlorosilane in lieu of the heptadecafluorodecyl-trichlorosilane and also the use of 1,1-dichloro-2,2,3,3,3-pentafluoropropane in lieu of cyclohexane.

EXAMPLE 3

The same experiment as in Example 1 was carried out except for the use of perfluorododecyl-trichlorosilane in lieu of the heptadecafluorooctyl-trichlorosilane.

EXAMPLE 4

The same experiment as in Example 1 was carried out except that, the disk having been oxygen plasma treated, was dipped and held in a cyclohexane solution containing 1% by weight of tetrachlorosilane in a nitrogen atmosphere and at room temperature for 60 minutes. Non-reacted tetrachlorosilane was removed by washing the disk with cyclohexane and then with pure water. The experiment was carried out using a dry sample.

COMPARATIVE EXAMPLE 1

Unlike Example 1, a silicon nitride film was provided by the plasma CVD process to a thickness of 150 nm on the transparent substrate.

COMPARATIVE EXAMPLE 2

Unlike Example 1, a $SiO_2$ film was provided by the vacuum deposition process to a thickness of 150 nm on the transparent substrate.

COMPARATIVE EXAMPLE 3

Unlike Example 1, an ethylene-vinyl acetate copolymer film was provided to a thickness of 150 nm on the transparent substrate.

COMPARATIVE EXAMPLE 4

An optical disk without any protective film, i.e., any chemically adsorbed film, was used as sample and maintained at 70° C. and at a relative humidity of 80% to examine its transmittance to light (830 nm) over time.

Figure 2:
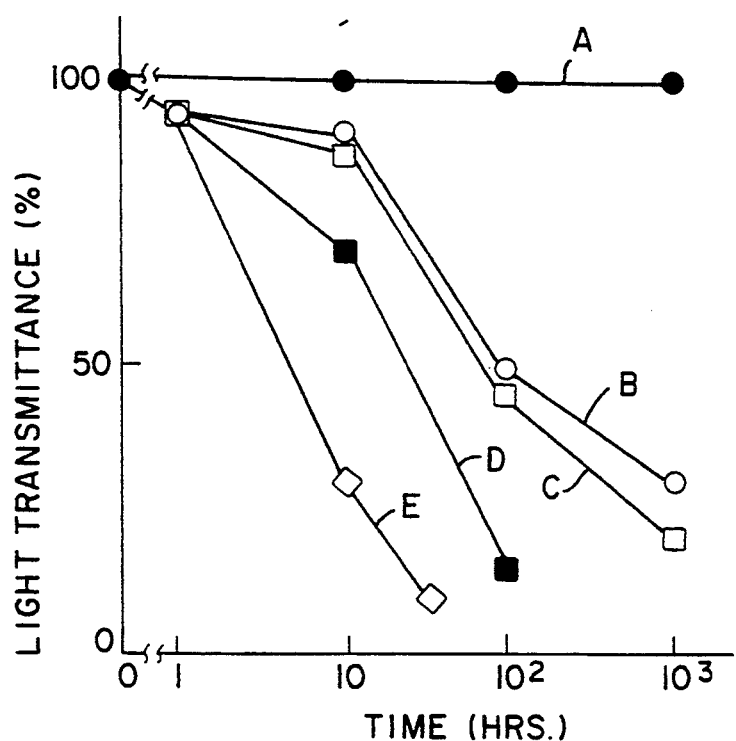
FIG. 2 is a graph showing the transmittance to light (830 nm) of the embodiment in FIG. 1 and a comparative example of the optical recording medium at 70° C. and at a relative humidity of 80%, plotted against time.

In FIG. 2, curve A shows light transmittance over time of Examples 1 to 4, and curves B to E show those of Comparative examples 1 to 4, respectively.

As is seen from FIG. 2, the light transmittance of the optical recording medium according to the invention is not substantially changed even after 1,000 hours, indicating that is not corroded or deteriorated but stable under high temperature, high relative humidity conditions. In contrast, in the comparative examples in 10 to 100 hours the recording film was corroded and deteriorated due to the separation of the film or formation of cracks, and the light transmittance was extremely reduced.

EXAMPLE 5

An optical recording layer 12 mainly composed of tellurium dioxide ($TeO_2$) and tellurium (Te) was vacuum deposited on one surface of a polycarbonate substrate 11 having a thickness of 1.2 mm and a diameter of 120 mm, and on the layer 12 was formed by spattering a metal oxide film 13 of $SiO_2$ with a thickness of 10 nm. The disk thus obtained was oxygen plasma treated in a UV dry stripper ("UV-1" manufactured by Samco International) at an oxygen flow rate of 1 l/min for 10 minutes, thus oxidizing the polycarbonate substrate surface. Then, it was dipped and held in a cyclohexane solution containing $10^{-2}$ mol/l of heptadecafluorodecyl trichlorosilane as a chlorosilane-based surface active material containing fluorocarbon groups, in a nitrogen atmosphere and at room temperature for 60 minutes. Non-reacted heptadecafluorodecyl trichlorosilane was removed by washing the disk with cyclohexane and then with water. Thus, a chemically adsorbed monomolecular film 15 was formed on the surface of $SiO_2$ layer 13 and polycarbonate substrate surface 11.

EXAMPLE 6

The same experiment as in Example 5 was carried out except that $TiO_2$ was used in lieu of $SiO_2$ in the metal oxide layer.

EXAMPLE 7

The same experiment as in Example 5 was carried out except that $Al_2O_3$ was used in lieu of $SiO_2$ in the metal oxide layer.

EXAMPLE 8

The same experiment as in Example 5 was carried out except that after plasma treating, the disk was dipped and held in a cyclohexane solution containing 1% by weight of tetrachlorosilane in a nitrogen atmosphere and at room temperature for 60 minutes. Non-reacted tetrachlorosilane was removed by washing the disk with cyclohexane and then with water. The experiment was carried out using a dry sample.

EXAMPLE 9

The same experiment as in Example 5 was carried out except for using 9-(heptadecafluorodecyldimethylsilyl-nonyltrichlorosilane) in lieu of the heptadecafluorodecyl trichlorosilane and using tri-(n-nonafluorobutyl) amine in lieu of the cyclohexane.

COMPARATIVE EXAMPLE 5

Example 5 was carried out except that a sample without a chemically adsorbed film was produced.

Figure 4:
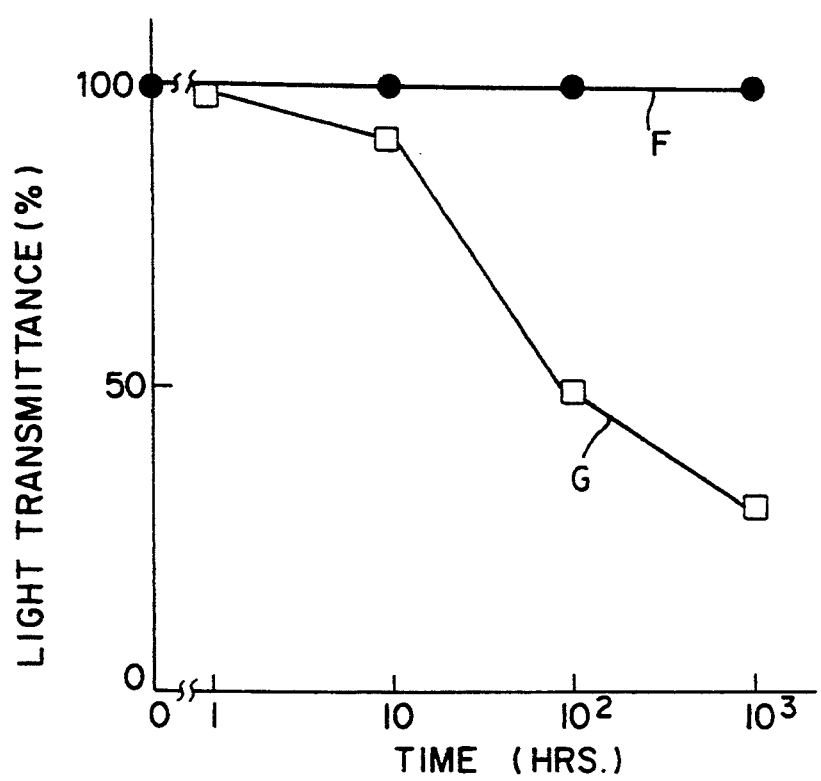
FIG. 4 is a graph showing the transmittance to light (830 nm) of the embodiment of FIG. 3 and a comparative example of the optical recording medium at 70° C. and at a relative humidity of 80%, plotted against time.

The sample was held at 70° C. and at a relative humidity of 80%. Changes in the transmittance of the sample to light (830 nm) over time were examined. FIG. 4 shows the results. In the Figure, curve F shows the light transmittance of Examples 5 to 9, over time, and curve G shows the light transmittance of Comparative example 1.

As is seen from FIG. 4, the light transmittance of the recording media according to the invention was not substantially changed even after 1,000 hours, and the recording film was not corroded or deteriorated under high temperature, high relative humidity conditions. In contrast, in the comparative example the recording film was corroded or deteriorated in 10 to 100 hours due to the separation of the film or formation of cracks, and the light transmittance was extremely reduced.

EXAMPLE 10

The same experiment as in Example 5 was carried out except that after plasma treating the disk was dipped and held for about 30 minutes in a solution prepared by dissolving 1% by weight of a material containing a plurality of chlorosilyl groups, e.g., SiCl$_4$ being small in molecular size and greatly reactive with respect to hydroxyl groups, thus rendering the surface uniformly hydrophilic in a non-aqueous solvent, e.g., FREON 113 solvent. As a result, a dehydrochlorination reaction was brought about due to hydrophilic —OH groups more or less present at the surface of the substrate, whereby a chlorosilane monomolecular film of the material containing a plurality of trichlorosilyl groups was formed.

As an example, using SiCl$_4$ as the material containing a plurality of trichlorosilyl groups, a dehydrochlorination reaction was brought about on the surface due to a small quantity of hydrophilic —OH groups being exposed at the substrate surface. Molecules represented by formulas 4 and/or 5 were formed.

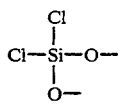  [Formula 4]

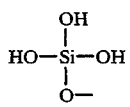  [Formula 5]

Those bonds were connected to the substrate surface by —SiO— bonds.

Subsequently, the substrate was washed with a non-aqueous solvent, e.g., FREON 113 to remove unreacted SiCl$_4$ molecules, and then with water thus obtaining a siloxane monomolecular film at the substrate surface as shown by formulas 6 and/or 7.

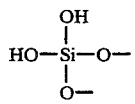  [Formula 6]

[Formula 7]

The above washing step with the FREON 113 was omitted, and a siloxane-based polymer film was adsorbed to the substrate. The siloxane-based polymer film was in satisfactorily close contact with the substrate.

The monomolecular film was completely bonded by chemical bonds of —SiO— to the part surface and did not separate. In addition, its surface contained numerous silanol (—SiOH) bonds corresponding to about three times the initial number of hydroxyl groups.

As a further example, a substrate provided with a monomolecular film formed on its surface and containing numerous —SiOH bonds, was dipped and held for about one hour in a non-aqueous solution containing a material containing a fluorocarbon and a chlorosilane group, e.g., a solution prepared by dissolving about 3 wt. % of

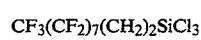

in a solvent containing FREON 113. The film was then washed with FREON 113 to remove unreacted material remaining on the surface, followed by washing with water or exposing to air containing moisture. As a result, bonds of

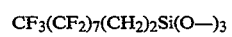

were formed on the surface, and a fluorine-containing monomolecular film was formed as above in formulas 1 to 3. The film was densely formed over the disk surface and chemically bonded to the inner siloxane monomolecular film. Its thickness was about 1.5 nm. This laminated monomolecular film did not separate in a peel-off test.

EXAMPLE 11

An optical recording layer mainly composed of tellurium dioxide (TeO$_2$) and tellurium (Te) was vacuum deposited on one surface of a polycarbonate substrate 1 having a thickness of 1.2 mm and a diameter of 120 mm. To the layer 2 was then applied another polycarbonate substrate 1 same as that noted above using a UV-setting adhesive, thus obtaining a disk. The disk thus obtained was oxygen plasma treated in a UV dry stripper ("UV-1" manufactured by Sacom International) at an oxygen flow rate of 1 l/min. for 10 minutes to oxidize the surface. The disk was exposed and held in a gaseous phase of heptadecafluorodecyl-trichlorosilane in a desiccator at room temperature for 120 minutes. The disk was exposed to air containing moisture.

As a result, bonds of $$CF_3(CF_2)_7(CH_2)_2Si(O-)_3$$

were formed on the surface, and a fluorine-containing monomolecular film was formed as above in formulas 1 to 3. The film was densely formed over the disk surface as a chemically bonded monomolecular film. Its thickness was about 1.5 nm. This monomolecular film did not separate in a peel-off test.

While the above examples were concerned with optical recording films based on Te and $TeO_2$, this is by no means limiting, and the same effects can be expected with other optical recording films based Tb, Fe, Co systems or Al systems.

As has been described in the foregoing, according to the invention a chemically adsorbed film containing siloxane bonds is provided on the outer surface of a transparent substrate having an inner optical recording layer. It is thus possible to improve the water- and moisture-repelling properties, which is very beneficial in industry.

In addition, further improvement of the water- and moisture-proof properties can be improved by forming a metal oxide layer on the optical recording layer provided on one surface of a transparent substrate and providing a chemically adsorbed film containing siloxane bonds on the metal oxide layer surface or on the surfaces of both the metal oxide layer and the transparent substrate, thus providing great usefulness in practice. As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A method of manufacturing a optical recording medium comprising:
   contacting a substrate surface with a non-aqueous solution containing a surface active material having fluorocarbon groups and chlorosilane groups, said substrate surface having active hydrogen groups;
   removing unreacted surface active material remaining on the substrate by washing the substrate with a non-aqueous organic solution to form an adsorbed monomolecular precursor film;
   reacting unreacted chlorosilane groups on the adsorbed monomolecular precursor film with water after the removing step; and
   drying the adsorbed monomolecular film.

2. The method of manufacturing a optical recording medium according to claim 1, wherein said surface active hydrogen groups are selected from the group consisting of hydroxyl groups, amino groups, and imino groups.

3. The method of manufacturing an optical recording medium according to claim 1, wherein said substrate surface is made hydrophilic prior to said contacting step by plasma or corona treatment in an oxygen or nitrogen atmosphere.

4. The method of manufacturing an optical recording medium according to claim 1, wherein said surface active material is $CF_3(CF_2)_n(R)_mSiX_pCl_{3-p}$ where n represents 0 or an integer, R represents an alkylene group, vinylene group, ethynylene group, or a substituted group containing a silicon atom or an oxygen atom, m represents 0 or 1, X represents a hydrogen atom or a substituted group consisting of an alkyl group or an alkoxyl group, and p represents 0, 1 or 2.

5. The method of manufacturing an optical recording medium according to claim 1, wherein an inorganic oxide film is formed by spattering or vacuum deposition on an optical recording layer, and said adsorbed monomolecular precursor film is formed on said inorganic oxide layer.

6. The method of manufacturing an optical recording medium according to claim 1, wherein the substrate surface is contacted with a non-aqueous solution containing a multi-functional surface active material having chlorosilane groups, said substrate surface having active hydrogen groups, thereby causing a chemical adsorption reaction, and forming a chemically adsorbed film containing siloxane bonds.

7. A method of manufacturing an optical recording medium comprising:
   contacting a substrate surface with a non-aqueous solution, said non-aqueous solution containing a surface active material having fluorine groups and chlorosilane groups and said substrate surface having active hydrogen groups to form a precursor polymer film on said substrate surface;
   reacting said precursor polymer film on the substrate surface by reacting the chlorosilane groups with water to form silanol groups; and
   drying said adsorbed polymer film.

8. A method of manufacturing an optical recording medium, comprising contacting the surface of a transparent substrate having an optical recording layer with a surface active material containing halosilane under a gaseous phase condition and then reacting said surface active material with water, thereby forming a chemically adsorbed film.

9. A method of manufacturing an optical recording medium according to claim 8, wherein an inorganic oxide layer is formed on said optical recording layer, and wherein said inorganic oxide layer or both said inorganic oxide layer and said transparent substrate are contacted with a chlorosilane-based surface active material under a gaseous phase condition, and said surface active material is reacted with water, thereby forming a chemically adsorbed film.

* * * * *